(12) United States Patent
Park (10) Patent No.: US 8,561,347 B1
(45) Date of Patent: Oct. 22, 2013

(54) PORTABLE PLANTING SYSTEM AND METHOD

(76) Inventor: Hong Ku Park, Huntsville, AL (US)

(*) Notice: Subject to any disclaimer, the term of this patent is extended or adjusted under 35 U.S.C. 154(b) by 275 days.

(21) Appl. No.: 13/186,088

(22) Filed: Jul. 19, 2011

(51) Int. Cl.
*A01G 9/02* (2006.01)

(52) U.S. Cl.
USPC ............................................ 47/65.8; 47/66.7

(58) Field of Classification Search
USPC .................................... 47/65.8, 66.7, 73, 78
See application file for complete search history.

(56) References Cited

U.S. PATENT DOCUMENTS

| | | | |
|---|---|---|---|
| 3,548,906 A | 12/1970 | Murphy | |
| 3,581,347 A | 6/1971 | Verspieren | |
| 3,613,309 A | 10/1971 | Coburn | |
| 3,962,823 A | 6/1976 | Zipperer, III | |
| 4,006,561 A * | 2/1977 | Thoma et al. ...................... | 47/84 |
| 4,008,512 A | 2/1977 | Prodel | |
| 4,112,541 A | 9/1978 | Tetradis | |
| 4,209,945 A | 7/1980 | Dent et al. | |
| 4,248,462 A | 2/1981 | Choi | |
| 4,263,697 A | 4/1981 | Speedie | |
| 4,299,056 A | 11/1981 | Towning | |
| 4,306,745 A * | 12/1981 | Wenk ............................ | 292/318 |
| 4,506,415 A | 3/1985 | Swift | |
| 4,881,301 A | 11/1989 | Sweeney et al. | |
| 5,193,306 A | 3/1993 | Whisenant | |
| 5,309,673 A | 5/1994 | Stöver et al. | |
| 5,715,629 A * | 2/1998 | Hawkins ........................ | 47/65.5 |
| 5,921,601 A | 7/1999 | Buckles | |
| 5,946,854 A | 9/1999 | Guillemain et al. | |
| 6,016,628 A | 1/2000 | Schlösser | |
| 6,085,461 A * | 7/2000 | Brisson et al. ..................... | 47/78 |
| 6,202,348 B1 * | 3/2001 | Reiger .............. | 47/78 |
| 6,415,548 B1 | 7/2002 | Mumme | |
| 7,845,112 B2 * | 12/2010 | Felknor .......................... | 47/65.8 |
| 2007/0214718 A1 * | 9/2007 | Park ..................... | 47/79 |
| 2010/0000149 A1 * | 1/2010 | Ouellet et al. ................ | 47/32.7 |
| 2010/0218421 A1 * | 9/2010 | Monnes ......................... | 47/29.5 |

FOREIGN PATENT DOCUMENTS

GB          2257885 A   *   1/1993

* cited by examiner

*Primary Examiner* — Monica Williams
*Assistant Examiner* — Joshua Huson
(74) *Attorney, Agent, or Firm* — Angela Holt; Bradley Arant Boult Cummings LLP (57) ABSTRACT

A portable planting system according to an exemplary embodiment of the present disclosure comprises a flexible, lightweight sack having an opening located in at least one end for receiving the soil. Opposing ends of the sack are held shut and supported by respective opposing handles which maintain the soil within the sack and allow the sack to be lifted and moved. Furthermore, the portable planting system comprises a liner which receives the sack. The liner has an upper opening for receiving the sack and opposing end openings for receiving the handles. Also, the portable planting system comprises one or more straps for containing the sack within the liner. Small holes can be poked in the exposed upper portion of the sack in order to plant individual plants and the sack prevents weeds from growing around the plants. The liner contains a portion of the water and provides stability to the portable planting system when the system is moved.

14 Claims, 9 Drawing Sheets

PORTABLE PLANTING SYSTEM AND METHOD

BACKGROUND AND SUMMARY

Planters are often used in homes and businesses for planting a variety of plants. Conventional planters, such as, for example, planter boxes and pots, typically contain soil for planting seeds and are capable of receiving water for nurturing the plants. Conventional planters come in a variety of shapes and sizes, and some conventional planters are portable. However, such portable planters are often heavy due to the amount of water collected inside and the water and soil can spill and create a mess when the planter is being moved. Furthermore, weeds often grow in the planters and interfere with the growth and health of the plants. These and other drawbacks are typical for conventional planters.

A portable planting system according to an exemplary embodiment of the present disclosure comprises a flexible, lightweight sack having an opening located in at least one end for receiving the soil. Opposing ends of the sack are held shut and supported by respective opposing handles which maintain the soil within the sack and allow the sack to be lifted and moved. Furthermore, the portable planting system comprises a liner which receives the sack. The liner has an upper opening for receiving the sack and opposing end openings for receiving the handles. Also, the portable planting system comprises one or more straps for containing the sack within the liner. Small holes can be poked in the exposed upper portion of the sack in order to plant individual plants and the sack prevents weeds from growing around the plants. The liner retains a portion of the water and provides stability to the portable planting system when the system is moved.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Figure 1:
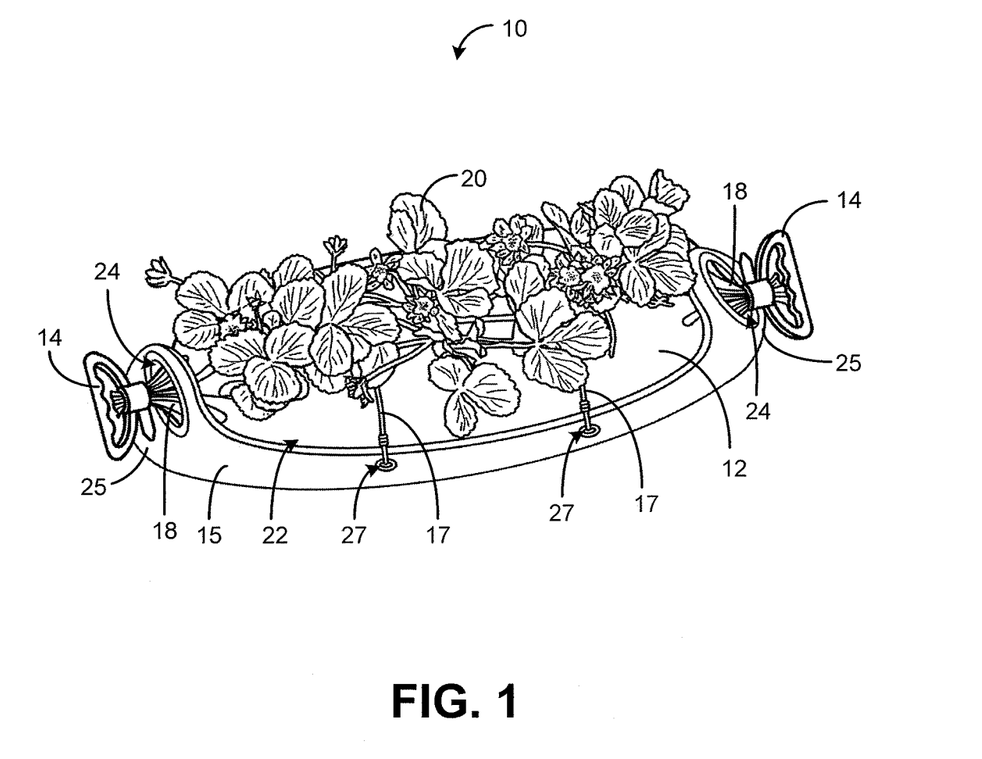
FIG. 1 is a top perspective view of an exemplary portable planting system in accordance with the present disclosure containing plants.

FIG. 1 depicts an exemplary embodiment of a portable planting system 10 in accordance with the present disclosure containing plants 20. In one embodiment, the portable planting system 10 comprises a flexible, lightweight sack 12, opposing handles 14 coupled to the sack 12, a liner 15, and one or more straps 17. The sack 12 is configured to receive and contain soil (not shown) into which plants 20 are planted. In one embodiment, the sack 12 comprises resilient nylon material, although different materials may be used for the sack 12 in other embodiments. The sack 12 has an opening (not shown in FIG. 1) located on at least one end 18 of the sack 12, and the opening receives the soil. The handles 14 are positioned on opposing ends 18 of the sack 12. In one embodiment, each handle 14 may be secured to an end 18 of the sack 12 in order to seal the opening positioned at the end 18 of the sack 12 such that the soil cannot escape the sack 12. However, other means for sealing the openings are possible in other embodiments.

Once the handles 14 are positioned on the sack 12 and the sack 12 is sealed, the liner 15 receives the sack 12. In this regard, the liner 15 has an upper opening 22 and opposing end openings 24. The liner 15 is water-tight such that any water seeping through the sack 12 is captured by the liner 15. In one embodiment, the liner 15 comprises plastic. However, different water-tight materials such as, for example, rubber or vinyl may be used for the liner 15 in other embodiments. The upper opening 22 extends along the top of the liner 15 and the upper opening 22 receives the sack 12. The opposing end openings 24 are positioned on opposing ends 25 of the liner 15 and receive the handles 14. In this regard, once the sack 12 is positioned within the liner 15 via the upper opening 22, each handle 14 is inserted through the corresponding opening 24 such that the handles 14 extend through opposing ends 25 of the liner 15 thereby securing the liner 15 to the sack 12 when the portable planting system 10 is lifted. Furthermore, the liner 15 traps a portion of the water applied to the plants 20 in order to maintain a moist environment for the plants 20 even when the system 10 is moved.

The liner 15 also has a plurality of apertures 27 for receiving the straps 17. The apertures 27 are positioned on opposing sides of the upper opening 22, and each strap 17 extends over the top of the sack 12 and is coupled to a corresponding pair of the apertures 27. The straps 17 secure the liner 15 to the sack 12 and ensure that the sack 12 does not escape the liner 15 when moved or lifted. In one embodiment, the straps 17 comprise elastic material having hooks on opposing ends, although different types of straps may be used in other embodiments.

Once the sack 12 is properly positioned and secured within the liner 15, the plants 20 may be planted in the sack 12. In this regard, small holes (not shown) are cut in the exposed top portion of the sack 12 and seeds (not shown) or small plants 20 are planted in the soil within the liner 15. The plants 20 may be watered and cared for in a similar manner to a conventional planter, but the sack 12 helps prevent weeds from sprouting and interfering with the growth and health of the plants 20. Furthermore, due to the portable nature of the system 10, the plants 20 may be moved to a more desirable location when desired by lifting the system 10 via the handles 14 and transporting the system 10 to the new location.

Figure 2:
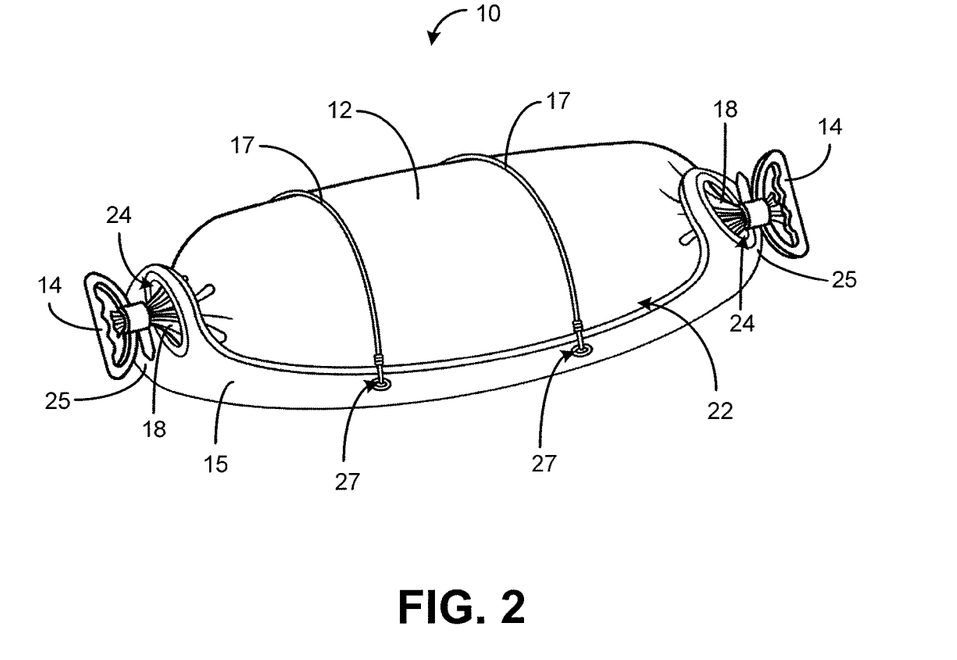
FIG. 2 is a top perspective view of the exemplary portable planting system of FIG. 1 containing no plants.

FIG. 2 depicts an exemplary embodiment of the portable planting system of FIG. 1 containing no plants 20 (FIG. 1). As shown by FIG. 2, a handle 14 is positioned upon each end 18 of the sack 12 and seals the sack 12 such that no soil can escape the sack 12, as will be discussed in more detail hereafter. When the sack 12 is filled with soil and sealed, the liner 15 is positioned upon the sack 12. In this regard, each opening 24 receives a corresponding handle 14 such that the handle 14 extends through the opening 24. Furthermore, the straps 17 extend over opposing sides of the sack 12 and couple to the liner 15 such that the liner 15 is tightly secured to the sack 12. As shown by FIG. 2, in one embodiment, the straps 17 couple to apertures 27 located on the liner 15. In such embodiment, each strap 17 couples to a corresponding pair of apertures 27 and tightly hugs the surface of the sack 12 in order to maintain close contact between the liner 15 and the sack 12. Although FIG. 2 depicts two straps 17, any number of straps 17 may be used in other embodiments.

As shown by FIG. 2, in one embodiment, the liner 15 extends approximately one-third up the sack 12 on opposing sides of the sack 12. However, the liner 15 may have other dimensions and extend varying distances up the sack 12 in other embodiments. In one embodiment, each handle 14 is positioned around an end 18 of the sack 12 and against a knot (not shown) which is tied in the sack 12. When the sack 12 is filled with soil, the soil within the sack 12 applies a constant pressure to the flexible sack 12 which holds the handle 14 against the knot and prevents the handle from 14 shifting out of place.

Figure 3:
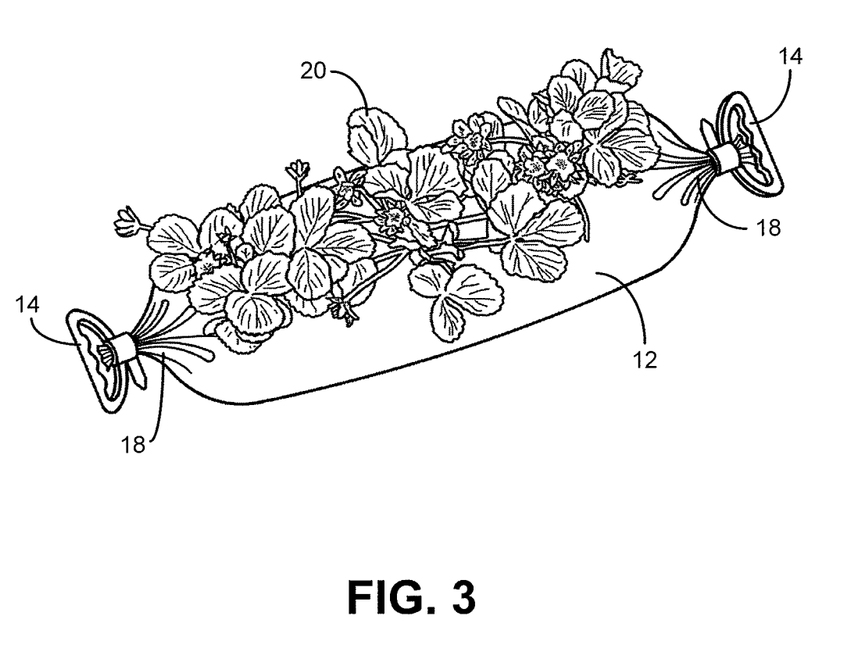
FIG. 3 is a top perspective view of the sack of FIG. 1 containing plants.

FIG. 3 depicts the sack 12 of FIG. 1 containing plants 20. In one embodiment, the sack 12 is a generally cylindrical tube having opposing ends 18, although the sack 12 may have different shapes in other embodiments. In one embodiment, depicted in FIG. 3, the sack 12 has two openings (not shown) which are located on the opposing longitudinal ends 18 of the sack 12. One of the openings is closed, such as, for example, by tying or clamping the end 18 of the sack 12, prior to filling the sack 12 with soil. In one embodiment, the opening is closed by tying a knot in the end 18 of the sack 12 and locking the handle 14 in the closed position around a portion of the sack 12 adjacent to the knot. Other means for closing the opening are possible in other embodiments. Soil is then placed within the sack 12 via the other opening until the sack 12 is filled and stretched tight. Such opening is then closed by any preferred method. The corresponding handle 14 is then locked in the closed position around the portion of the sack 12 at such end 18 of the sack 12. Accordingly, when the handles 14 are positioned at opposing ends 18 of the sack 12, the sack 12 may be lifted and moved.

Plants 20 may be planted in the sack 12 when the sack 12 is filled with soil. In this regard, small holes (not shown) may be cut in an upper surface of the sack 12 such that seeds or small plants 20 may be planted in the soil within the sack 12. The holes may be spaced apart any desired distance. The sack 12 minimizes the opportunity for weeds (not shown) to grow around the plants 20 and thereby endanger the health and appearance of the plants 20.

Furthermore, in one embodiment, the sack 12 comprises resilient nylon material which allows water to pass through. Thus, in order to properly water the plants 20, water may be applied to the plants 20 and/or an outer surface of the sack 12 and the water can seep through the sack 12 to the soil. However, the water may also seep through the bottom of the sack 12. Thus, the liner 15 (FIG. 1) is configured to catch the water when positioned beneath the sack 12 such that water remains in the liner 15 and maintains moisture in the soil.

Figure 4:
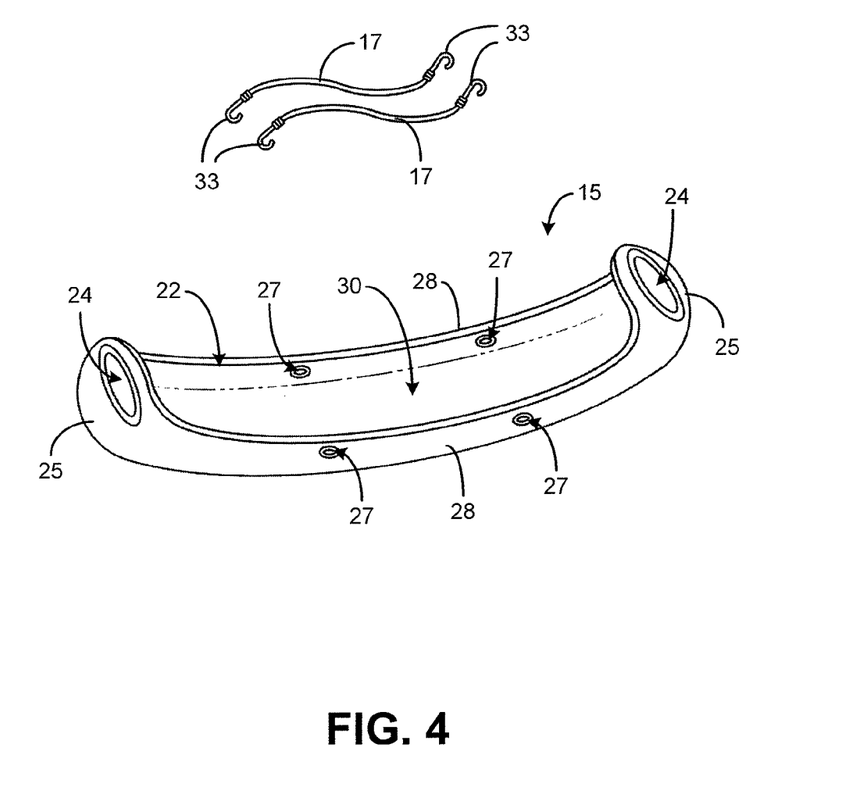
FIG. 4 is a top perspective view of the liner and straps of FIG. 1.

FIG. 4 depicts the liner 15 and the straps 17 of FIG. 1. As set forth above, the liner 15 comprises water-tight material such as, for example, plastic, rubber or vinyl, although other types of water-tight materials are possible in other embodiments. In one embodiment, the liner 15 is generally canoe shaped with long sides 28 and rounded ends 25. The liner 15 is generally elongated and has an upper opening 22 which forms a trough 30 within the liner 15. The liner 15 has a pair of opposing end openings 24 located on the opposing ends 25 of the liner 15. The opposing end openings 24 receive the respective handles 14 (FIG. 1) positioned on the opposing ends 18 of the sack 12 (FIG. 1). The upper opening 22 receives the sack 12 and a lower portion of the sack 12 rests within the trough 30. In one embodiment, approximately one-third of the lower portion of the sack 12 is positioned within the trough 30, although other portions are possible in other embodiments.

In one embodiment, the liner 15 also has a plurality of apertures 27 positioned on the liner 15 on opposing long sides 28 of the upper opening 22. The liner 15 shown in FIG. 4 depicts four apertures 27 for exemplary purposes, although any number of apertures 27 may be used in other embodiments. The apertures 27 receive the straps 17 in order to secure the straps 17 to the liner 15. In this regard, once the sack 12 is positioned within the trough 30, each strap 17 is secured to the aperture 27 on one long side 28 of the liner 15, positioned over the top of the sack 12, and then secured to the corresponding aperture 27 on the other long side 28 of the liner 15 in order to secure the sack 12 within the trough 30. Thus, the straps 17 are coupled to the liner 15 and secure the liner 15 to the sack 12. In one embodiment, each strap 17 comprises hooks 33 positioned on opposing ends of the strap 17 and the hooks 33 secure the strap 17 to the apertures 27. However, other means for securing the straps 17 to the liner 15 are possible in other embodiments.

The opposing end openings 24 and the straps 17 ensure that the liner 15 is tightly secured to the sack 12 such that the liner 15 will not shift or fall from the sack 10 when the system 10 is being moved. Accordingly, the liner 15 captures the water which seeps through the sack 12 and helps keep the soil damp for the benefit of the plants 20 (FIG. 1).

Figure 5:
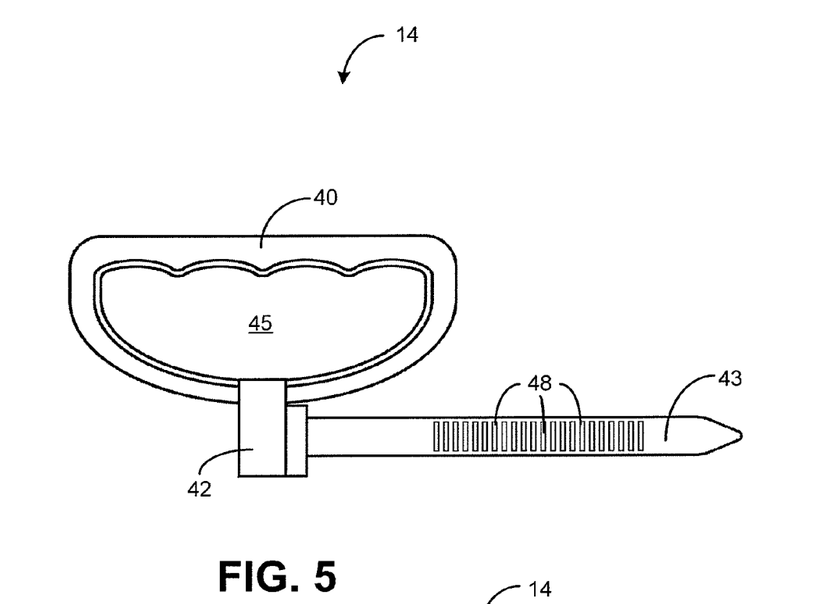
FIG. 5 is a back view of the handle of FIG. 1 in an open position.

FIG. 5 depicts a rear view of an exemplary embodiment of the handle 14 of FIG. 1. The handle depicted by FIG. 5 is in an open position. The handle 14 comprises a handle portion 40, a base 42, and a band 43. In one embodiment, the handle 14 is plastic, although different materials may be used for the handle 14 in other embodiments. The handle portion 40 is coupled to an upper portion of the base 42. The handle portion 40 has an opening 45 for receiving a user's fingers and enabling the user to apply a sufficient upward force on the handle portion 40 to lift the sack 12. The base 42 is generally rectangular in shape, although other shapes are possible. The band 43 extends horizontally from one side of the base 42. The band 43 comprises a plurality of teeth 48 positioned on a side of the band 43 for locking the band 43 within the base 42, as will be described in more detail hereafter.

Figure 6:
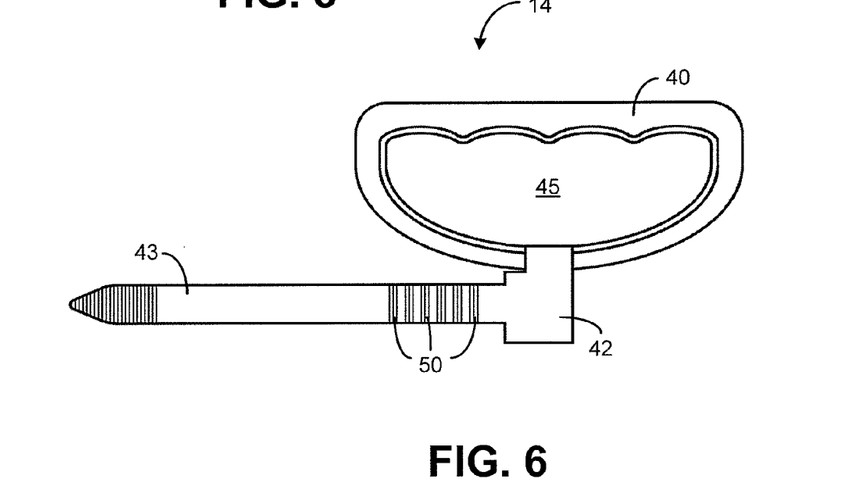
FIG. 6 is a front view of the handle of FIG. 5 in an open position.

FIG. 6 is a front view of the handle 14 of FIG. 5 in an open position. The handle portion 40 is coupled to an upper portion of the base 42 and the band 43 extends horizontally from the base 42. The band 43 further comprises a plurality of grippers 50 positioned on an opposing side of the band 43 from the teeth 48 (FIG. 5). The grippers 50 are located in close proximity to the base 42 and extend vertically on the band 43. Note that the grippers 50 only span a limited distance of the length of the band 43 such that they do not extend into the base 42 when the band 43 is in a closed position. The grippers 50 grip the sack 12 (FIG. 1) when the band 43 is in the closed position, as will be described in more detail hereafter. The grippers 50 prevent the handle from slipping off of the sack 12 when an upward force is applied to the handle portion 40.

Figure 7:
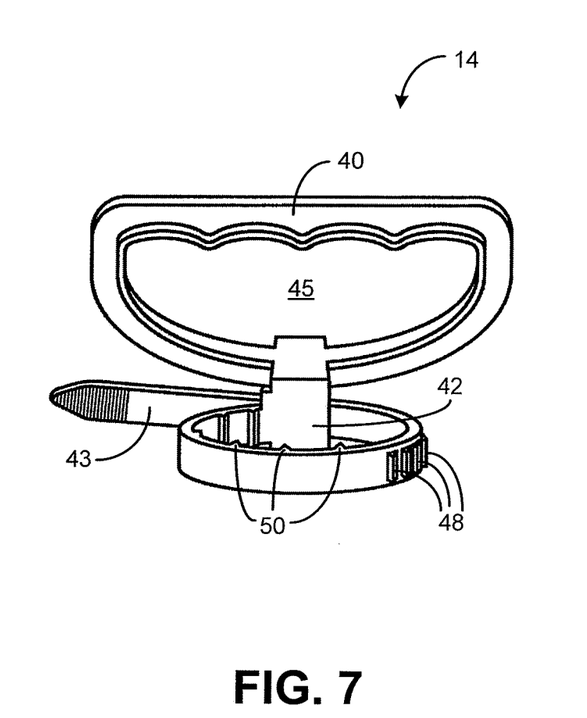
FIG. 7 is a front perspective view of the handle of FIG. 5 in a closed position.

FIG. 7 is a front perspective view of the handle 14 of FIG. 5 in a closed position. When the handle 14 is in the closed position, the band 43 is inserted through base 42 a desired distance such that the inner circumference of the band 43 is decreased. In this regard, the band 43 is flexible and may be bent when transitioning the handle 14 to the closed position is desired. Thus, the band 43 is bent around a portion of the sack 12 (FIG. 1) to the opposite side of the base 42 and inserted into a channel (not shown in FIG. 7) through the base 42. The channel has a locking device (not shown in FIG. 7) which engages with the teeth 48 in order to lock the band 43 within the base 42, discussed in more detail hereafter. In one embodiment, the teeth 48 are configured such that the band 43 may extend into the base 42 any desired distance but may not be removed. However, other types of bands 43 are possible in other embodiments.

When the band 43 is tightened around the sack 12 and locked into the base 42, the grippers 50 grip the sack 12 tightly in order to secure the band 43 to the sack 12. Thus, when strong force is applied to the handle portion 40, the sack 12 does not slip through the band 43 but instead remains tightly engaged within the band 43 due to the grippers 50. Accordingly, the handle 14 is sufficient to support the weight of the portable plant system 10 (FIG. 1) and to prevent unnecessary slipping.

Figure 8:
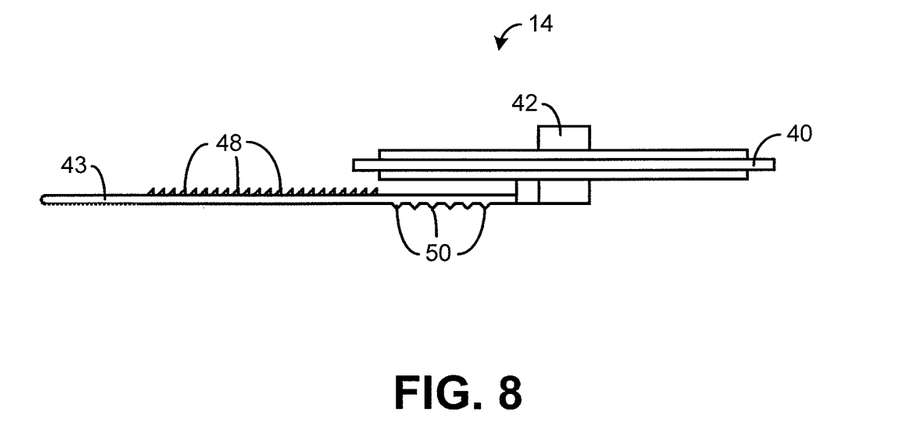
FIG. 8 is a top view of the handle of FIG. 5 in an open position.

FIG. 8 depicts a top view of the handle 14 of FIG. 5 in the open position. The handle portion 40 is coupled to the top of the base 42, as set forth above. The band 43 extends horizontally from the base 42, and the band 43 comprises the teeth 48 and the grippers 50. The teeth 48 are located on one side of the band 43 and the grippers 50 are located on the opposite side of the band 43. The teeth 48 and the grippers 50 extend in a generally perpendicular direction from the band 43. Note that, in one embodiment, the grippers 50 are not located directly opposite the teeth 48 on the band 43 but instead are offset towards the base 42. Such orientation of the grippers 50 prevents the grippers 50 from extending into the base 42 and allows only the teeth 48 to extend into the base 42.

In one embodiment, the teeth 48 are slightly angled on one side such that the teeth 48 may extend into the base 42 but may not be removed from the base 42 due to a locking mechanism (not shown in FIG. 8), discussed in more detail hereafter. However, the teeth 48 may have different orientations in other embodiments. The grippers 50 are configured to engage with an outer surface of the sack 12 when the band 43 is in the closed position.

Figure 9:
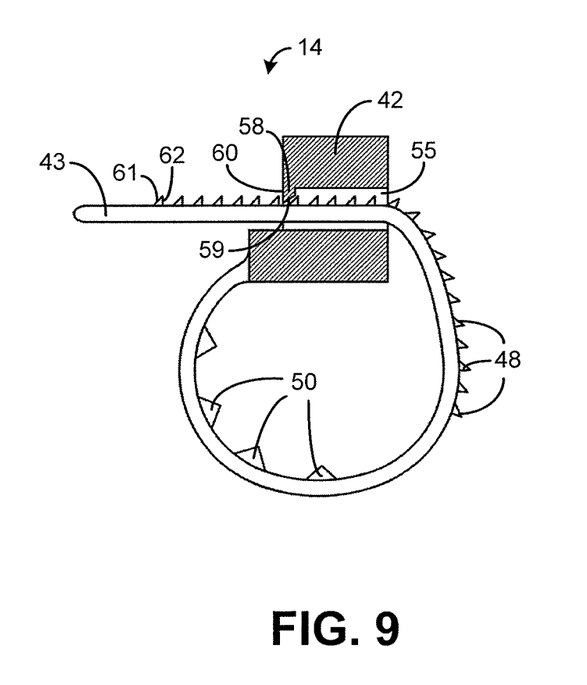
FIG. 9 is a cut-away view of the handle of FIG. 5 in a closed position.

FIG. 9 depicts a cut-away view of the handle 14 of FIG. 5 in the closed position. The base 42 has a channel 55 extending from side to side through the base 42 for receiving the band 43. When a user desires to transition the band 43 to the closed position around the sack 12 (FIG. 1), the user bends the band 43 around the sack 12 to an opposite side of the base 42 and inserts the free end of the band 43 into the channel 55. The band 43 is pushed through the channel 55 a desired distance such that the teeth 48 engage with a locking mechanism 58 positioned within the channel 55. In one embodiment, the locking mechanism 58 comprises a protrusion extending from a wall of the channel 55. The protrusion has a slanted edge 59 and a straight edge 60. The slanted edge 59 of the locking mechanism 58 allows slanted portions 61 of the teeth 48 to pass through the channel 55 such that an inner circumference of the band 43 may be reduced. Once each tooth 48 is pulled through the channel 55 past the locking mechanism 58, a straight portion 62 of the tooth 48 abuts the straight edge 60 of the locking mechanism 58 such that the tooth 48 is locked and may not pass back through the channel 55. Accordingly, the inner circumference of the band 43 may be further reduced but may not be increased once at least one of the teeth 48 passes through the channel 55. However, other types of locking mechanisms 55 are possible in other embodiments.

When the band 43 is inserted through the channel 55, the grippers 50 are oriented inwardly on the inner circumference of the band 43. Thus, as the inner circumference of the band 43 decreases, the grippers 50 gradually turn towards one another and grip the sack 12 in order to keep the handle 14 properly positioned upon the sack 12. Portions of the sack 12 may be pinched between the grippers 50 in order to prevent the sack 12 from slipping. As the band 43 is pulled through the channel 55, the inner circumference of the band 43 decreases and the grippers 50 grip the sack 12 with increasing tightness. Accordingly, the handle 14 does not shift once the band 43 is in the closed position and tightened around the sack 12.

Figure 10:
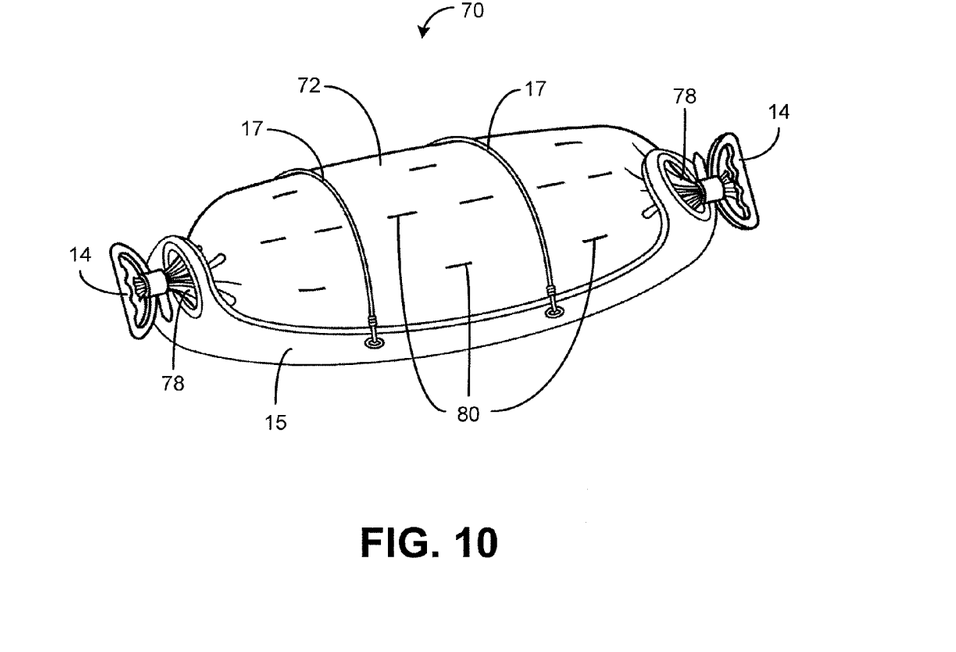
FIG. 10 is a top perspective view of another exemplary portable planting system containing no plants.

FIG. 10 depicts another exemplary embodiment of a portable planting system 70. The portable planting system 70 set forth in FIG. 10 is similar to the portable planting system 10 of FIG. 1. However, the sack 12 of the portable planting system 10 of FIG. 1 is replaced by a sack 72 in the portable planting system 70 of FIG. 10. Thus, the portable planting system 70 comprises the handles 14, the liner 15, and the straps 17, as described above herein.

The sack 72 of FIG. 10 is configured similarly to the sack 12 of FIG. 1. Thus, in one embodiment, the sack 72 is a generally cylindrical tube having opposing ends 78 with an opening positioned in each end 78, although the sack 72 may have different shapes and different numbers of openings in other embodiments. Furthermore, in one embodiment, the sack 72 comprises resilient nylon material. However, the sack 72 further comprises a plurality of pre-marked lines 80 on a top surface of the sack 72. The pre-marked lines 80 are configured to provide a desired pattern for planting the plants 20 (FIG. 1). Thus, when planting the plants 20 or seeds (not shown) is desired, a user simply cuts along the lines 80 and plants the plants 20 or seeds in the soil beneath the sack 72 thereby simplifying the planting process. The pre-marked lines 80 may be arranged in any pattern and are spaced apart a desired distance for allowing the plants 20 adequate room for growth. Accordingly, each plant 20 has sufficient space and soil, and plant 20 health is optimized. In one embodiment, each pre-marked line 80 comprises a white line approximately one-inch long, although the lines 80 may be different colors, lengths and shapes in other embodiments.

In one exemplary embodiment, assume that the sack 12 comprises resilient nylon material and the liner 15 comprises plastic. Also assume that the sack 12 has openings on opposing ends 18 of the sack 12. Further assume that the locking mechanism 58 in each handle 14 comprises a protrusion having a slanted edge 59 and a straight edge positioned within the channel 55. Finally assume that the liner 15 has four apertures 27 and the system 10 comprises two elastic straps 17 having hooks 33 on opposing ends for coupling to the corresponding apertures 27.

Figure 11:
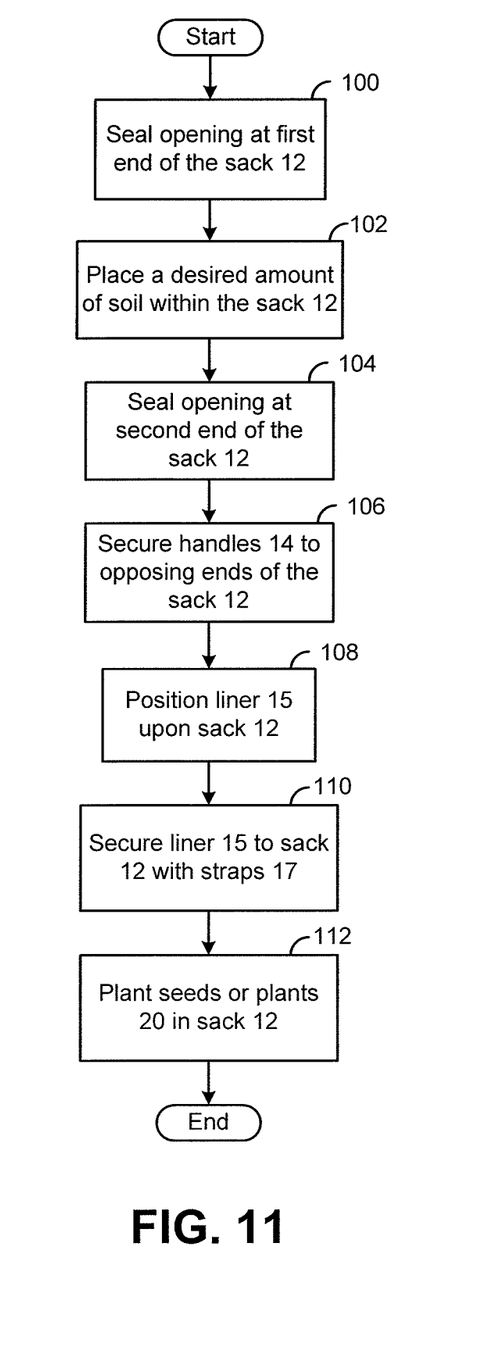
FIG. 11 is a flowchart illustrating an exemplary method for using a portable planting system.

In an exemplary use of the system 10, a first end 18 of the sack 12 is tied in a knot in order to seal the opening at such end 18 of the sack 12, as shown by block 100 of FIG. 11. Soil is placed inside the sack 12 via the other end opening until a desired amount of soil is located within the sack 12, as shown by block 102. In this regard, soil is typically placed in the sack 12 until the sack 12 is filled and slightly stretched. Once a desired amount of soil is placed within the sack 12, the other end 18 of the sack 12 is tied in a knot in order to seal the other end opening and to prevent soil from escaping the sack 12, as shown by block 104. The handles 14 are then secured to the sack 12 at opposing ends 18 of the sack 12, as shown by block 106. In this regard, the band 43 of each handle 14 is wrapped around a portion of the sack 12 adjacent to each knot and the band 43 is inserted into the channel 55 and tightened such that the teeth 48 engage with the locking mechanism 58. The band 43 is tightened until the grippers 50 grip the sack 12 and the band 43 reaches a desired tightness around the sack 12.

Once the handles 14 are secured to the sack 12, the liner 15 is positioned upon the sack 12, as shown by block 108. In this regard, the sack 12 is inserted into the trough 30 of the liner 15 via the opening 22 and each handle 14 is inserted through the corresponding opening 24 in the respective end 25 of the liner 15. The straps 17 are then coupled to the liner 15 in order to secure the liner 15 to the sack 12, as shown by block 110. In one embodiment, the hooks 33 on opposing ends of each strap 17 are inserted into respective apertures 27 on opposing sides of the opening 22 such that the straps 17 are positioned over the top of the sack 12 and secure the liner 15 to the sack 12.

Once the liner 15 is properly secured to the sack 12, a plurality of small holes may be cut into the exposed top surface of the sack 12 in order to expose the soil and allow seeds or plants 20 to be planted in the sack 12, as shown by block 112. After the seeds or plants 20 are planted, they may be watered in a similar manner to seeds or plants in a conventional planter. Furthermore, the portable planting system 10 may be easily moved or transported to a more desirable location. Accordingly, a portable planting system 10 is provided.

The invention claimed is:

1. A portable planting system, comprising:
a flexible, lightweight sack having an opening in at least one end of the sack;
a plurality of handles coupled to opposing ends of the sack, the handles comprising a base, a handle portion, and a band, wherein the base has a channel extending from side to side through the base, wherein a locking mechanism is located within the channel, and wherein the band has a plurality of teeth for engaging with the locking mechanism and securing the handle to the sack;
a water-tight liner positioned around a lower portion of the sack, the liner having a plurality of openings at opposing ends for receiving the corresponding handles; and
at least one strap for securing the liner to the sack,
wherein the sack receives soil and is sealed, and wherein plants are planted in the soil through the sack.

2. The system of claim 1, wherein the sack comprises resilient nylon material.

3. The system of claim 1, wherein the liner comprises plastic.

4. The system of claim 1, wherein the at least one strap comprises elastic.

5. The system of claim 4, wherein the elastic strap has a hook on opposing ends of the strap, and wherein the liner has a plurality of apertures for receiving the hooks and securing the liner to the sack.

6. The system of claim 1, wherein the handles comprise plastic.

7. The system of claim 1, wherein the band further comprises a plurality of grippers positioned on a side of the band for gripping the sack when the band is in a closed position.

8. A portable planting system, comprising:
a resilient nylon sack having openings in opposing ends of the sack for receiving soil;
a plurality of plastic handles, each handle positioned around the opening in the respective end of the sack, the handle configured to seal the opening, each handle comprising a base, a handle portion, and a band, wherein the base has a channel extending from side to side through the base, wherein a locking mechanism is located within the channel, and wherein the band has a plurality of teeth for engaging with the locking mechanism and securing the handle to the sack;
a plastic liner having opposing end openings for receiving the handles, the liner also having a plurality of apertures; and
at least one strap for securing the liner to the sack via the apertures,
wherein plants may be planted in the soil through a top surface of the sack.

9. The system of claim 8, wherein the strap comprises elastic.

10. The system of claim 9, wherein the elastic strap has a hook on opposing ends of the strap, and wherein the hooks couple with the apertures and secure the liner to the sack.

11. The system of claim 8, wherein the band further comprises a plurality of grippers positioned on a side of the band for gripping the sack when the band is in a closed position.

12. A method of using a portable planting system, comprising:
sealing an opening in a first end of a flexible sack;
placing a desired amount of soil within the sack;
sealing an opening in a second end of the sack;
securing handles to opposing ends of the sack, the handles comprising a base, a handle portion, and a band, wherein the base has a channel extending from side to side through the base, wherein a locking mechanism is located within the channel, and wherein the band has a plurality of teeth for engaging with the locking mechanism and securing the handle to the sack;
positioning a water-tight liner upon the sack, the liner having a plurality of openings at opposing ends for receiving the corresponding handles;
securing the liner to the sack with one or more straps; and
planting seeds or plants in the soil through a top surface of the sack.

13. The method of claim 12, wherein the positioning step further comprises inserting the handles through respective openings in opposing ends of the liner.

14. The method of claim 12, wherein the securing step further comprises inserting a portion of each strap through respective apertures in the liner.

* * * * *